(12) United States Patent
Wachter et al.

(10) Patent No.: US 7,920,938 B2
(45) Date of Patent: Apr. 5, 2011

(54) CONCEPT FOR MONITORING THE MANUFACTURE OF OBJECTS CONSISTING OF MULTIPLE MATERIAL LAYERS

(75) Inventors: Markus Wachter, Bernkastel-Kues (DE); Peter Schmitt, Erlangen (DE); Guenther Kostka, Erlangen (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 474 days.

(21) Appl. No.: 11/917,837

(22) PCT Filed: Jun. 16, 2006

(86) PCT No.: PCT/EP2006/005804
§ 371 (c)(1),
(2), (4) Date: Jul. 10, 2008

(87) PCT Pub. No.: WO2006/133957
PCT Pub. Date: Dec. 21, 2006

(65) Prior Publication Data
US 2009/0171494 A1 Jul. 2, 2009

(30) Foreign Application Priority Data
Jun. 17, 2005 (DE) .......................... 10 2005 028 231

(51) Int. Cl.
*G06F 19/00* (2006.01)
(52) U.S. Cl. ......................................... 700/121; 438/66
(58) Field of Classification Search ................. 700/97, 700/121, 110, 119; 438/66
See application file for complete search history.

(56) References Cited

U.S. PATENT DOCUMENTS

| | | | |
|---|---|---|---|
| 3,843,434 A | 10/1974 | Heiks et al. | 156/110 |
| 4,088,721 A | 5/1978 | Apicella, Jr. | 264/40.4 |
| 5,322,655 A * | 6/1994 | Ebey | 264/40.5 |
| 5,851,323 A * | 12/1998 | Kaido et al. | 152/510 |
| 5,942,059 A | 8/1999 | Wulker et al. | 156/64 |
| 6,443,385 B1 | 9/2002 | Grandauer et al. | 242/476.7 |
| 7,213,451 B2 * | 5/2007 | Zhu et al. | 73/146 |
| 7,413,919 B2 * | 8/2008 | Qing et al. | 438/48 |

FOREIGN PATENT DOCUMENTS

| | | |
|---|---|---|
| EP | 1 022 199 | 7/2000 |
| EP | 1 418 043 | 5/2004 |

OTHER PUBLICATIONS

European Search Report, completed Sep. 11, 2006.

* cited by examiner

*Primary Examiner* — Kidest Bahta
(74) *Attorney, Agent, or Firm* — Richard B. O'Planick

(57) ABSTRACT

The manufacture of an object consisting of multiple material layers successively built up one upon the other can be monitored in an advantageous manner in that after the application of a material layer, a height profile of a circumference of the object is established, such that after the application of each material layer, a comparison with a reference information can be used for evaluating whether the preceding production step delivered a result which enables to draw the conclusion of a faultless application of the material layer.

8 Claims, 3 Drawing Sheets

CONCEPT FOR MONITORING THE MANUFACTURE OF OBJECTS CONSISTING OF MULTIPLE MATERIAL LAYERS

BACKGROUND OF THE INVENTION (1) Field of the Invention

The present invention relates to a method for monitoring the manufacture of objects consisting of multiple material layers, such method being applicable, for example, in the production of preformed parts consisting of multiple layers of a material or of wires.

(2) Description of Related Art Including Information Disclosure Under 37 C.F.R. 1.97 and 1.98

There are numerous applications in which parts are produced on an industrial scale from multiple individual layers by successively layering the individual layers or by winding the layers around a winding core, respectively. For example, electric coils are wound from wires and thus successively built layer for layer, rotor blades for wind energy plants in part are also manufactured by winding individual layers of a suitable material onto a basic frame. In all methods, the aim is to obtain, at the end of the manufacturing process, an object having a desired three-dimensional design.

When manufacturing rotor blades for wind energy plants, for example, the proceedings are such that individual layers of a material are wound onto a basic frame, wherein these layers, for example, may consist of resin-soaked fiber-reinforced mats of synthetic material, which, after hardening of the resin, result in a very sturdy preformed body. Thereby, the glass fiber mats are provided on large drums, from which they are reeled off in the course of the production in order to be wound onto the basic frame as individual layers, such that, put in an illustrative manner, the construction is performed similar to applying a plaster bandage. It is important for the safety of the final element that a required minimum material thickness is maintained everywhere at the element, such that the stability of the finished rotor blade is guaranteed.

In the production of electric coils, thus, the winding of the coil wire, the correct construction of the individual layers then is of particular importance, when a high electric voltage drops along the coil wire. Then, with a faulty winding, a voltage difference may occur between two adjacent wire pieces, which is so high that the break-through voltage of the insulation is exceeded, due to which the coil is destroyed when in use. What is important here is, on the one hand, that per applied winding layer there is no deviation from a nominal thickness of the winding layer, thus, this thickness is not exceeded when, for example, two layers cross each other due to faulty winding. On the other hand, also the exact geometrical positioning of the individual wire is of interest in order to prevent the above-described case of the destruction of the coil. In particular, coils are also applied for creating high, precisely-defined magnetic fields in order to enclose, for example, gas plasma within a vacuum by means of the magnetic field created by means of the coils. In such cases, the individual windings of the coils have complicated geometrical shapes, thus, then have to be wound according to an exactly calculated scheme, such that in this utilization case not only the total material thickness of a finished wound coil is of interest, but also the geometrical arrangement of the individual windings, their winding sequence, respectively, is of interest.

A further example, in which products are manufactured on an industrial scale by means of winding techniques, is the production of tires. When building automobile tires, individual rubber layers are wound onto a drum-like carrier, by which successively the finished raw tire is created, which tire may also consist of multiple different rubber compounds. Thereby, air bubbles may form between the individual rubber layers during the winding process; by process faults, for example, when supplying rubber, it may happen that the material thickness of the finished tire locally is too low or too high. A finished produced tire must have a defined local material thickness, thus, have a cross-section following a predetermined profile. With too low material thickness, a tire blow-out may occur; if the material thickness locally is too high, this may lead to undesired running characteristics of the tire, such as, for example, imbalance or radial run-out. In order to prevent the safety risks concomitant with tires manufactured not according to standards, it must be ensured that the tire's cross-section follows the predetermined profile over the entire circumference of the tire.

Testing industrially-made parts, which are manufactured in a laminate or winding technology, according to the state of the art takes place after manufacturing. Thereby, the finished part is examined in respect to its inner construction. To this end, known non-destructive testing procedures, such as, for example, the ultrasound technology or X-raying by means of computer-assisted tomography, are applied.

A huge disadvantage consists in that the testing effort and the expenditure connected thereto, in particular when applying the computer-assisted tomography, are very high and that the test object is examined only after completion, thus, at a point in time when the total manufacturing costs already have occurred. There are also technological limits to the post-finishing testing method, for example, in the case of examination of a coil, it is principally impossible to conclude, after the finishing of the latter, by an imaging method the sequence in which the individual windings have been applied. Also, in part the local resolution, by which a finished object can be reconstructed, is too small to be able to localize small flaws within a compact three-dimensional object.

In particular with automobile tires, there is the problem that it is difficult to discern inclusions within the rubber layers, as in X-rays they show only a very limited contrast difference to the rubber material surrounding them.

BRIEF SUMMARY OF THE INVENTION

The object of the present invention consist in providing a method and a device for monitoring the manufacture of an object consisting of multiple material layers, by which the manufacture of such object can be monitored more precisely and efficiently.

This object is solved by a method according to claim 1 and by a device according to claim 10.

The present invention is founded upon the recognition that the manufacture of an object consisting of multiple material layers successively being layered one upon the other can be monitored in that after the application of each layer a height profile of a circumference of the object is established, such that after the application of each material layer a comparison with a reference information can be used for evaluating whether the preceding production step has given a result enabling the conclusion that the material layer has been applied faultlessly. Thereby, the substantial advantage of the inventive method consists in that the spatial construction of the object, the tested part, respectively, is not sensed and tested after manufacture, but that, however, it is tested during manufacturing itself whether each individual layer has been applied correctly, such that, starting from the first layer, a 3D model of the body to be built can be made, in which model the material thickness added by a material layer is documented at any position of the surface of the object. Thereby, the location-dependent total material thickness results as a local sum of the layer thicknesses respectively applied.

The inventive method is particularly advantageous in that, by monitoring the product creation process, mistakes may be recognized which, for technological reasons, could not be recognized with the prior non-destructive testing methods at the finished object, as the testing method presented here, contrary to the prior applied methods, does not serve for examining a finished product for compliance with the requested guidelines (in particular the local thickness or a sequence of layers, or wires, respectively), but rather for monitoring, controlling, respectively, the construction itself and thereby improving the quota for the delivery of parts with an acceptable quality level.

From the knowledge of the thickness of individual layers (which may also consist of different materials, as, for example, mats from rubber, glass fiber and synthetic material, or metal foils) and from the detection of the 3D shape of an object after the application of every individual layer, for example, conclusions can be drawn in respect to air inclusions or also to the faulty positioning of an individual layer, when, for example, the measured local total thickness does not correspond to the sum of the (possibly measured beforehand, or known) thickness of the individual layers.

According to an embodiment example of the present invention, the production of a tire is monitored in accordance with the invention, wherein the tire is manufactured by winding multiple layers of rubber onto a cylindrical carrier. By the inventive method now an air inclusion between individual layers can be detected, which, for example, shows as a local thickness increase. The particular advantage therein consists in that an air inclusion, which is difficult to substantiate by means of the conventional testing methods after the completed production of the tire, can be proven very easily, wherein an additional advantage consists in that, depending on the severity of a recognized fault, the production may already be terminated before the actual end thereof, in order to thus save material.

In a further embodiment example of the present invention, the method according to the invention for monitoring the manufacture of an object is used for determining the end of a production process based on winding. To this aim, after each winding procedure, the distance of the surface of the object to be produced to a fixedly established sensor is determined, wherein the object is manufactured by winding several layers of a material around a cylindrical object carrier. When the distance of the surface of the object to the sensor drops below a certain minimum measurement, then the production process is terminated, i.e., no further layers of the material will be wound onto the object. This offers the huge advantage that, even if the material to be would is subjected to an unpredictable thickness alteration, an element can be created having a determinable local material thickness, wherein the local material thickness does not depend on the number of winding cycles, as this is the case otherwise.

A further advantage of the method according to the invention is that a sensor technology can be used for monitoring the manufacture of an object that rotates during manufacture, which is extremely cost-efficient and technologically inexpensive. So, it suffices in the above-described method, for example, to record a one-dimensional height profile, for example, by a light-section procedure, as the object to be produced continuously passes beneath the sensor, such that by combination of the angle of rotation of the object to be wound with the one-dimensional recording of a height profile, a complete two-dimensional image of the height profile on the surface of the object to be produced can be reconstructed.

It is a further advantage of the present invention that any other kind of creating a height profile of the objects to be monitored is possible; in particular, also methods can be applied which directly can measure a two-dimensional height profile, such as, for example, strip-projection methods or capacitive measuring methods, wherein the capacity of a surface to a given reference surface is measured, wherein the measured capacity depends on the relative distance of the two surfaces to each other.

In a further embodiment example of the present invention, the production of an electrical coil is monitored according to the invention, i.e. after each application of a winding layer, a surface height profile of the coil is created, wherein, when winding a coil, not only the local material thickness may be a substantial criterion, but also the sequence and the geometric orientation, in which the individual windings are brought onto the winding core. In that by the inventive method an examination of the geometry is performed after every individual winding layer, it is also possible to detect faults in the sequence of the winding, which principally is not possible with testing methods based on the examination of the finished wound coil.

The inventive method is not limited to objects which are created by winding layers of a material or by winding wires, however, it may also be applied to bodies and objects which are created by successive application of discrete layers (as, for example, glass fiber mats) of predetermined shape and thickness onto a carrier, as it is the case, for example, in the production of wings of aircrafts. Thereby, each individual layer may have a different shape and optionally also a different local thickness.

In a further embodiment example according to the invention, thus, the construction of a planar body, which is formed by laminating several layers of resin-soaked glass fiber mats, is monitored. Thereby, the height profile of the surface of the body is measured after the application of each individual layer, and the correct application of the layer is compared to a height information expected due to the local layer thickness, is examined, respectively. Thereby, for determining the height information, a method is employed which can produce a two-dimensional height profile of an object to be examined. Thus, after each production step, a complete three-dimensional surface of the object to be examined is reconstructed in that for each point of the surface of the object, the distance to a given reference point is determined. Thereby, it is possible, at the one hand, to apply a one-dimensional light-section procedure, in which height information solely is created along a measuring line, wherein the measuring line must be moved over the entire object to be examined in order to obtain a complete two-dimensional height profile. On the other hand, here, too, the strip-projection procedure may be applied, which directly delivers a two-dimensional height information.

In a further embodiment example of the present invention, the method is modified such that after the determination of the height profile of a basic area, thus, the surface on which the first layer of a layer material is provided, solely the height profile, after applying a final layer, is determined afresh. If one can proceed from the assumption that the basic area is not mechanically deformed during the production process, in this manner the achievement of an intended desired material thickness of the produced object can be examined. If solely the material thickness of the finished product is crucial, according to the invention an examination can be performed in an advantageous manner, wherein the testing expenditure can be substantially reduced, as in accordance with the invention merely two height profiles have to be recorded and evaluated.

In a further form of embodiment of the present invention, during production by the inventive method, it is evaluated whether the basic area, upon which the first material layer is applied, deforms due to forces effecting thereon during production. However, this is difficult to determine by test methods after the manufacture of the finished objects, when the basic body having the basic area, remains in the object after finishing of the object, as this is the case, for example, when manufacturing rotor blades. Thereby, according to the invention a height profile is established after the application of each individual layer, which height profile is compared to a stored height profile having been established after the application of the preceding layer. By location-dependent subtractions of the height profiles, one obtains the location-dependent thickness information of the newly provided layer. When, after the application of each layer, the created thickness profile is summed up to a total thickness profile, then, after the end of the production, the total thickness profile of the produced object is obtained, such that, by combining the last-measured surface profile with the total thickness profile, conclusions to the shape of the carrier body may be drawn in order to thereby determine, for example, an undesired deformation thereof. Thus, the final form of the interior wall of the finished object results from determination of the height information after application of the last layer and consideration of the local sum of the provided material thicknesses. The inventive method is applicable even when the wound, or applied in layers, material is compressible, wherein then, however, a possibly created compression in the direction of the normal of the surface, thus, the direction which, location-dependent, always stands perpendicularly on the surface, must be known from corresponding tests.

In a further preferred embodiment example of the present invention, the production of automobile tires is monitored and controlled according to the invention. Thereby, in particular the application of rubber layers on a tire body is monitored. The rubber layers are provided on the basic body in several layers by winding a rubber material onto a cylindrical basic body, wherein according to the invention after each layer a height profile of the provided layer is established. Thereby, in particular air inclusions can be substantiated in a safe manner, which will be hardly detectable after finishing the entire tire, as the air, for example, may be compressed, such that no local increase of the height profile can be proven on the surface of the finished tire. Nevertheless, in the interior of the tire the connection between two successive layers is affected by the entrapped air volume, wherein it has to be taken into account that high temperatures may occur in the operation of a tire, such that the entrapped air thermally expands and thereby possibly deteriorates the mechanical connection between the two rubber layers concerned and, in an extreme case, even separates the two layers over the entire width of the tire from each other. According to the invention, now such air inclusion may be recognized safely in that the force effecting on an entrapped air bubble by merely one other rubber layer is small, such that the entrapped air bubble merely is slightly compressed and can easily be verified as a local increase within a height profile of the tire surface.

BRIEF DESCRIPTION OF THE DRAWINGS

In the following, preferred embodiment examples of the present invention are illustrated in detail, with reference to the accompanying drawings. Thereby.

DETAILED DESCRIPTION OF THE INVENTION

Figure 1:
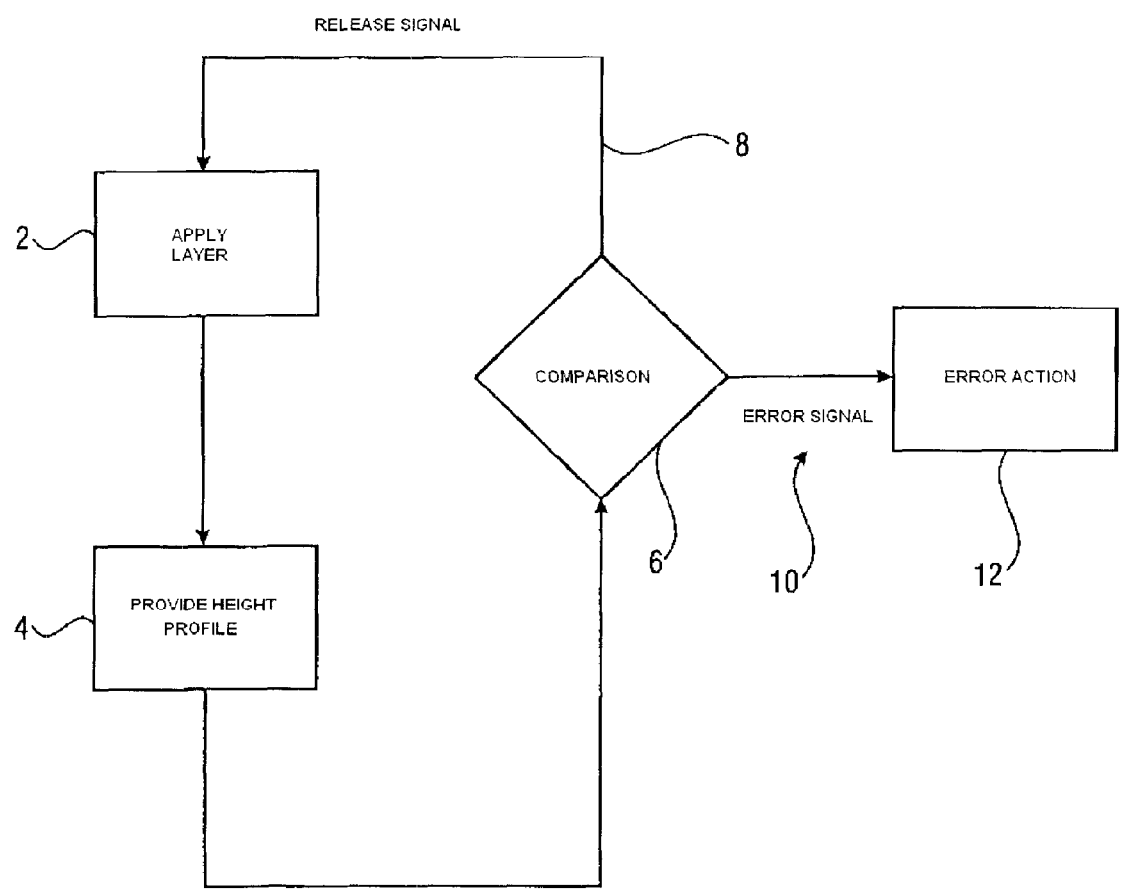
FIG. 1 shows a method for monitoring the manufacture.

FIG. 1 shows a flow chart, by means of which the inventive method for monitoring the manufacture of an object consisting of multiple material layers is explained in the following.

Thereby, first of all in a first manufacturing step 2 a material layer of the object to be manufactured is applied.

After applying the material layer, in a provision step 4, a height profile of the surface of the object is provided, which is processed further in the subsequent step.

In the comparison step 6, the provided height profile is compared to a reference information, wherein the reference information preferably is a desired height profile. If in comparison step 6 a comparison result is obtained which indicates that the material layer has been applied faultlessly, a release signal 8 is given which then prompts a new application of a further layer.

If comparison step 6 delivers a result indicating a faulty application of the material layer, an error signal 10 is given, which prompts the taking of error measures 12.

As is evident from FIG. 1, thus, during production the production can be terminated at any time as soon as an error signal 10 is given, which may lead to considerable cost savings when processing cost-intensive materials, as the material portion can be saved from the occurrence of the error signal 10 up to finishing the final product. Thus, when processing carbon fiber composites in layers, according to the invention considerable cost savings can be performed.

By means of FIG. 2, in the following a preferred embodiment example of the present invention is to be illustrated, wherein the construction of a preformed part from a layer material is described, which material is provided in a long length on a roll and wherein the layer material during production is wound around a carrier body.

Figure 2:
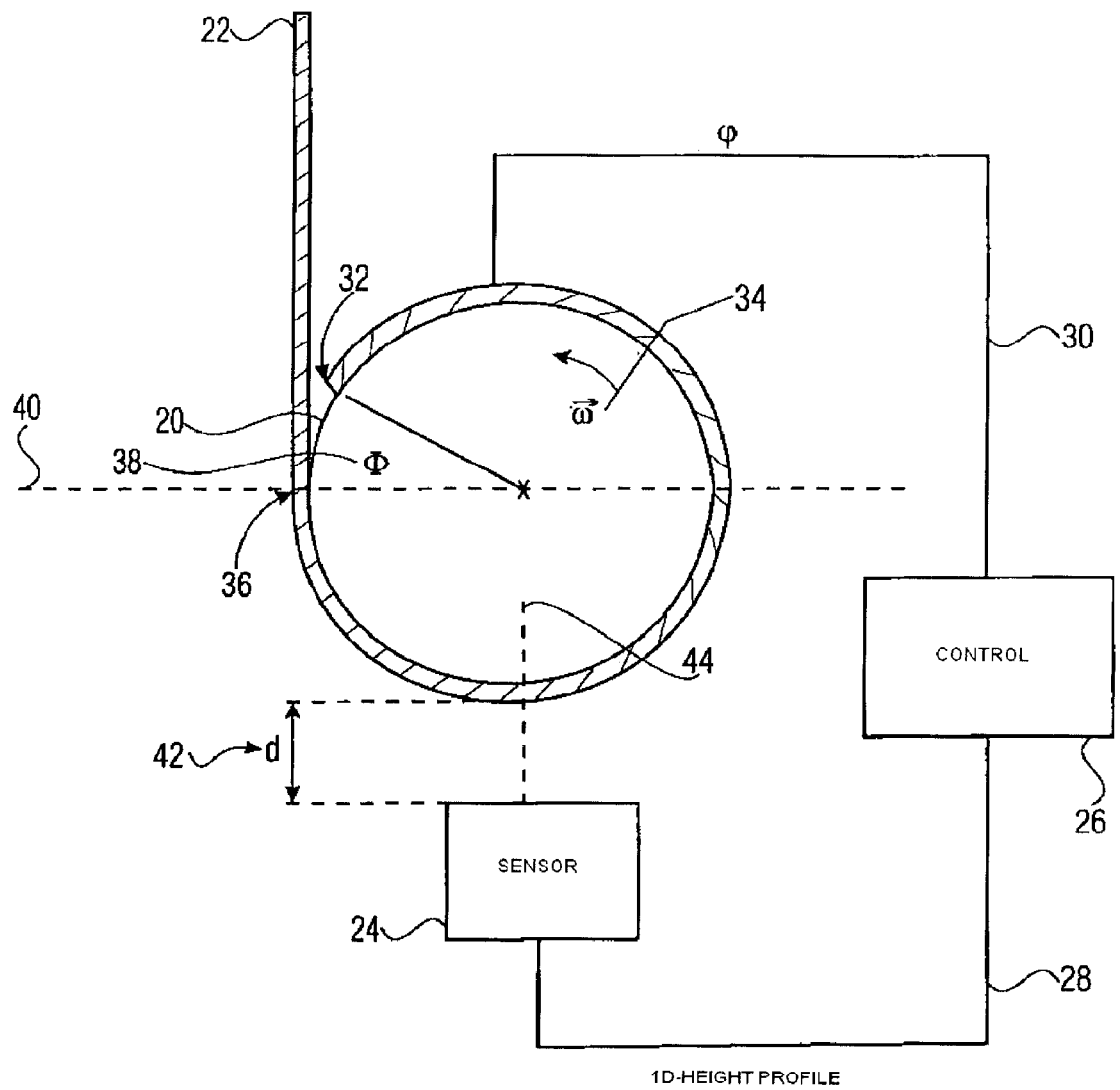
FIG. 2 monitoring a preformed part consisting of wound layer material.

FIG. 2 shows a carrier body 20, a layer material 22, a sensor 24, and a control 26.

Via a first data connection 28, control 26 is connected to the sensor 24, and via a second data connection 30 to the carrier body 20.

Thereby, the carrier body 20, on the one hand, may become a part of the final product or may be removed at the end of the production process, wherein none of the two possibilities is preferred for the inventive method, as the method permits both possibilities.

At the beginning of the production, the layer material 22 is fixedly connected to the carrier body 20 at a receiving point 32. In the following, it is considered that the product to be produced is rotated with the carrier body 20 during winding, and that the layer material 22 is provided from a constant direction tangentially on the carrier body 20. In the top view onto the cylindrical carrier body 20 and the belt-shaped carrier material 22, shown in FIG. 2, thus the carrier body 20 during production is rotated with an angular velocity 34 ($\omega$), such that the carrier material 22, at the contact point 36, is rolled tangentially onto the carrier body 20. Thereby, an angle 38 ($\phi$) between a reference plane 40 and the receiving point 32 is a measure for how many layers of the carrier material 22 already have been wound onto the carrier body 20. Namely, when successively summing up the angle 38 starting from the beginning of the winding process, then per application of an entire layer of the layer material 22 an increase of the angle 38 of $2\pi$ is obtained.

Thereby, the sensor 24 determines during the rotation, dependent from the angle 38, the distance 42 ($d$) between the sensor 24 and the wound carrier material 22 along a measuring line 44.

Thereby, the sensor 24 determines a one-dimensional height profile of the surface of the wound carrier material 22 along the measuring line 44, in dependency from angle 38. The one-dimensional height profile is transferred via the data connection 28 to the control 26, wherein at the same time the information to which angle 38 the transferred height profile belongs, also is transferred via the data connection 30 to the control 26. By combining a plurality of one-dimensional height profiles with the angles 38 associated therewith, the control 26 calculates a two-dimensional height profile describing the surface of a completely wound layer of the layer material 22, such that after finishing each individual layer, the complete 3D information of the surface of the object to be produced is available.

After respectively a complete winding of the layer material 22 around the carrier body 20, the control 26 compares the determined 3D height profile to a desired height profile in order to evaluate whether a fault, as, for example, the entrapment of an air bubble, has occurred during the winding of the last layer. In this case, an error measure is taken, which may consist in, for example, the control 26 terminating the winding of the layer material 22 around the carrier body 20, in order to sort out unfinished objects as rejects.

Figure 3:
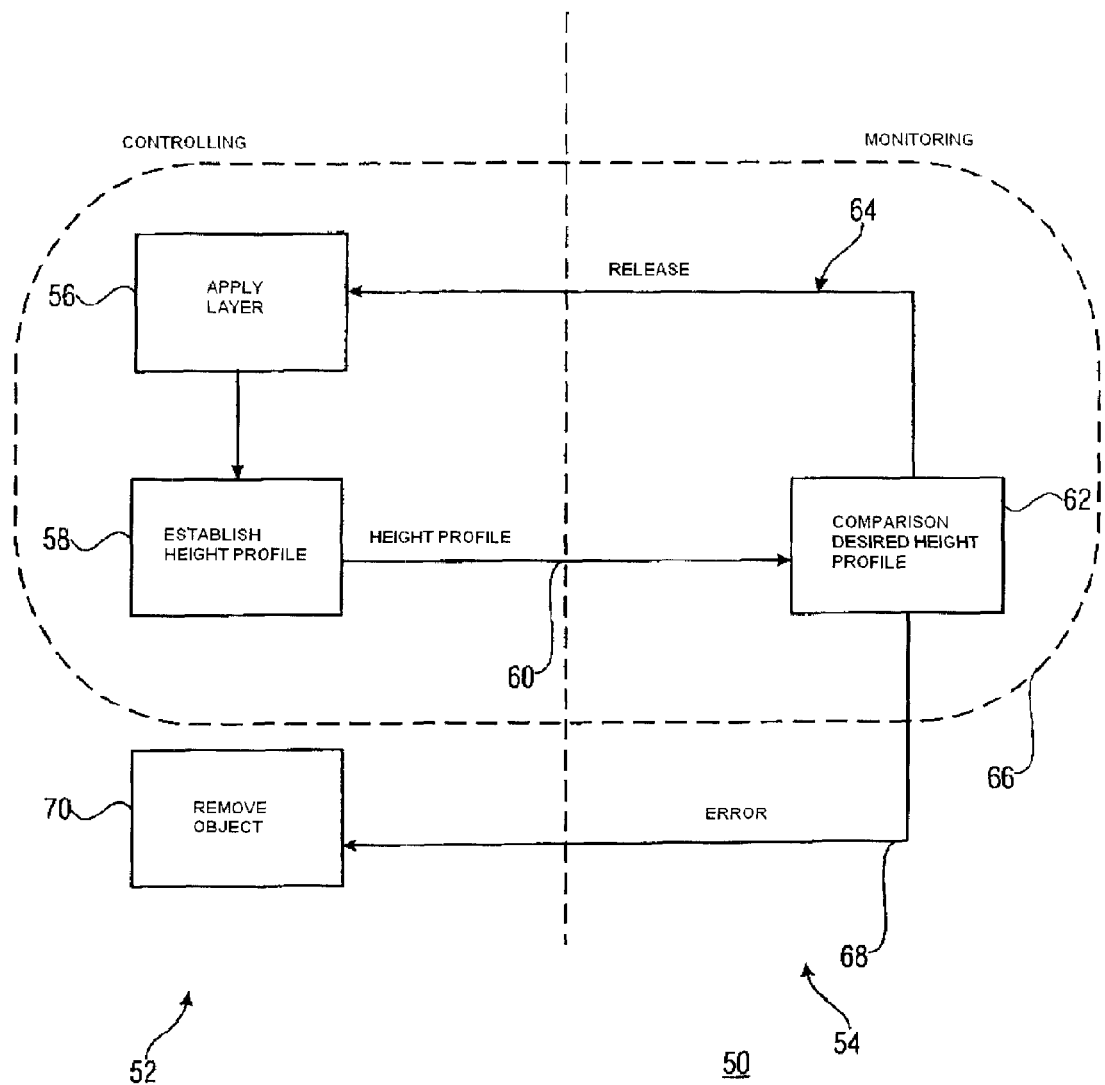
FIG. 3 system for monitoring and controlling a manufacturing process.

In the embodiment example of FIG. 3, a system 50 for controlling and monitoring the manufacture of objects consisting of multiple material layers is represented. Thereby, the system comprises a control part 52 and a monitoring part 54.

In a first procedure step, in an application step 56 the application of a material layer onto the body to be produced is controlled. Thereupon, in measuring step 58 the height profile of the applied layer is determined.

By means of a data connection 60, the height profile is made available to the monitoring part 54 of the system 50, which, in comparison step 62, compares the height profile to a desired height profile.

When in comparison step 62, a result is obtained which indicates a faultless application of the material layer during application step 56, then a release information is transferred via a data interface 64 to the control part 52 of the system 50, such that this can perform another application step. In this case, thus, a production cycle circle 66 closes, which comprises the entire application of a material layer and the inventive examination of the application of the material layer.

When comparison 62 delivers a result indicating a faulty application of the material layers in application step 56, then an error signal is transferred to the control part 52 via a data interface 68, such that this control part can control an error measure 70, which, for example, comprises the removal of the object to be created from the production plant.

In the inventive embodiment example described in reference to FIG. 1, after each application of a material layer a height profile is established, whereby according to the invention, it may be equally advantageous to determine a height profile only after applying a plurality of material layers for saving in this manner processing time of the testing procedure.

Although in the described forms of embodiment, a comparison of the measured height profile to a desired height profile is performed, according to the invention also a dynamically tracked, predicted desired height information can be used, which is based on the height profiles recorded up to then. So, it would be possible, for example, when determining a dropping below a desired material thickness, to calculate a material thickness profile of the next layer to be provided from the intended desired thickness of the object and the last-recorded height profile, in order to choose from a plurality of available material layers the one, whose application onto the object guarantees achieving the desired value, as the chosen material layer has a thickness profile suited to this aim.

According to the invention, the production of an object manufactured from multiple layers may be monitored also in this respect that the layer thicknesses of the successive layers are as homogenous as possible, thus, equally distributed. This is advantageous in particular when, for example, the strength of a finished object can not be derived merely from the thickness of the applied material, but when it must also be taken into account that individual functional material layers are arranged within the object as uniformly as possible. This is difficult to evaluate by means of a method examining a finished object only after finishing in a non-destructive manner.

In the described embodiment examples, a created height profile primarily is used for comparing it to a desired height profile in order to monitor the faultless progress of a production. Moreover, each height profile can be stored after comparing, such that, after finishing the production, a complete reconstructed three-dimensional image of the created object is available, for instance, for utilizing it further within the scope of electronic data processing. This is in particular highly advantageous when a complex-designed object must be created from possibly multiple different material layers, as by means of the inventive method each individual layer is measured after its application, such that a three-dimensional image of the inner construction of the finished object with a high local resolution can be created.

For the working of the embodiment example according to the invention, shown in FIG. 2, in the beginning of the winding the layer material is provided on the carrier body along a predetermined line. During the rotation of the carrier body, the layer material passes a measuring line, at which the height information of the carrier body including the applied material is detected. To this aim, first it is presupposed that the carrier body itself consists of a material without gaps, a drum without gaps, respectively, such that before the application of the first material layer the location-dependent height information of the carrier body can be taken into account for determining the contact area.

Alternatively, the carrier body may also show gaps, which means, it may show recesses in its surface, whereby then first the height information after applying the first layer of the layer material must be measured in order to calculate the local position of the basic area (of the carrier body) by taking into account the local thickness of the layer material, said thickness being presumed as known or being measured beforehand. According to the invention, the method thus may also be applied for monitoring the production on a carrier body with surface interruptions, wherein then during the winding of the objects the height information is continuously detected along a reference line, which reference line is allocated to the rotational position of the carrier body. Thereby, just as with a carrier body with continuous surface, it is possible to permanently monitor whether the local material thickness, which is depending on the rotational position, corresponds to the desired values.

In the embodiment example of the present invention described in FIG. 2, a one-dimensional measuring procedure is used as a measuring procedure for determining the height information, as provided, for example, by the light-section procedure. In the light-section procedure, a light line is projected onto the test body, which line is recorded with a matrix camera at a known angle to the projection direction. From the position of the light line in the camera image, after a calibration of the measuring system, the local height information along the light line can be inferred. However, the testing procedure presented here may be performed with all physical measuring procedures delivering a height information.

In particular, the inventive method is also independent from the manner in which the application of the layers is taking place and in which manner the height information after application of a layer is determined. What is important is in fact that the invention starts from determining a basic area corresponding to the interior wall of the created body, and the construction of the body is tracked by determining the height information after applying each individual layer. Therefore, also measuring procedures can be used which directly provide for a two-dimensional height profile, in which thus the height profile of a three-dimensional object does not have to be constructed first by means of an angle of rotation and a one-dimensional height profile, as this is the case in the embodiment example according to the invention in FIG. 2.

Thus, also the strip-projection procedure comes into consideration as a method for determining a height profile, as well as other, non-optical methods, as, for example, a capacitive measuring procedure or also a tactile measuring procedure, in which the surface to be examined is mechanically read.

Although in the embodiment example of the present invention, which is described in FIG. 2, the application of the layer material 22 onto the carrier body is monitored in respect to reaching a desired thickness, the control 26 also can be used to actively influence the intended desired thickness. When, for example, the layer material 22 is a rubber material, then a tension is exerted onto the supplied layer material 22 due to the drum (the carrier body 20) rotating at the angular velocity w. A tension of an elastic material, such as rubber, results in that the material stretches, which causes a thickness variation of the supplied layer material 22. When now, for example, after applying a complete layer, the control 26 determines that the layer-dependent desired thickness of the materials is exceeded, then, for example, by varying the angular velocity 34, thus, in the described case, by increasing it, the tension on the layer material 22 may be increased, by which the material is stretched more strongly and thus the next applied layer causes a smaller increase of the thickness.

A control, as described above, of an applied thickness of a layer material of a rubber compound is particularly advantageous in the production of tires, as herein, a precise observance of the total material thickness is important, whereby the above-described inventive method contributes to observing the material thickness in that a thickness alteration of the supplied layer material 22 can be compensated during production.

In the system for controlling and monitoring a production of an object composed of multiple layers, described in FIG. 3, it is suggested that the method of controlling and the method of monitoring are performed such that the components participating in the methods are situated in spatial proximity to each other. However, it is perfectly possible to spatially separate the control part 52 and the monitoring part 54 of the system 50, as shown in FIG. 3, from each other, wherein the data connections 60, 64 and 68, which connect the control part 52 and the monitoring part 54, may be based on cordless or on wire-bound technologies. In particular, also a connection via a computer network, as, for example, the internet, is possible, which is advantageous in case that the reference information in the form of a database is not available at the location of production, such that, for example, the method for controlling the production is performed at the production location, whereas the method for monitoring the production is performed at another location, as, for example, at a data processing center.

Depending on the circumstances, the inventive method for monitoring can be implemented in hardware or in software. The implementation can be performed on a digital storage medium, in particular a diskette or CD with electronically readable control signals, which can cooperate with a programmable computer system such that the inventive method for monitoring is performed. In general, the invention thus also consists of a computer program product with a program code stored on a machine-readable carrier for performing the inventive method, when the computer program product is running on a computer. In other words, the invention thus can be realized as a computer program with a program code for performing the method, when the computer program is running on a computer.

The invention claimed is:

1. Method for monitoring a manufacture of an object, said object having a first material layer and a second material layer lying on top of the first material layer, comprising the following steps:
   determining a height profile of the first material layer after applying the first material layer on a layer carrier;
   comparing the height profile of the first material layer to a reference information;
   in case that in the comparison step a first result is obtained indicating an intact application of the first layer, supplying release information, by which a release of the application of the second material layer onto the first material layer can be prompted;
   in case that in the comparison step a second result is obtained indicating a faulty application of the first material layer, taking an error action;
   the reference information comprises a desired height profile and the comparison effects the first result when the height profile deviates from the desired height profile by less than a predetermined tolerance threshold, and wherein the comparison otherwise obtains the second result;
   when the first result has been obtained in the comparison step, the method includes performing an update step whereby a new desired height profile is formed as the reference information from a linear combination of the desired height profile and a desired thickness profile describing an ideal thickness course of the second material layer;
   wherein the determination of a height profile of the second material layer after applying the second material layer on the first material layer; and
   wherein the height profile of the applied second material layer is compared with the new desired height profile and, in case that in this comparison step a result is obtained indicating a faulty application of the second material layer, taking an error action.

2. Method according to claim 1, in which the predetermined desired height profile is stored in a memory and is read out from the memory after the application of the first material layer.

3. Method according to claim 2, which, when the first result had been obtained in the comparison step, includes an update step, wherein in the update step a new desired height profile is formed as the reference information from the linear combination of the desired height profile and a desired thickness profile describing an ideal thickness course of the second material layer.

4. Method according to claim 2, which, when the first result had been obtained in the comparison step, includes an update step, wherein in the update step a new desired height profile is formed as the reference information from the linear combination of the height profile and a desired thickness profile describing an ideal thickness course of the second material layer.

5. Method according to any of the claims 1, 2, 3, and 4, in which the error action comprises marking the object as flawed.

6. Method according to any of the claims 1, 2, 3, and 4, in which the error action comprises preventing the application of the second material layer.

7. Method according to any of the claims 1, 2, 3 and 4, wherein the object is a tire.

8. Computer program with a program code for performing the method for monitoring a manufacturing process according to claim 1, when the program is running on a computer.

* * * * *